US00RE37040E

(19) United States
(12) Reissued Patent
Hughes et al.

(10) Patent Number: US RE37,040 E
(45) Date of Reissued Patent: Feb. 6, 2001

(54) EVAPORATOR WITH IMPROVED CONDENSATE COLLECTION

(75) Inventors: Gregory G. Hughes, Milwaukee, WI (US); Norman F. Costello, Farmington Hills, MI (US); Leon Guntly, Racine, WI (US)

(73) Assignee: Modine Manufacturing Company, Racine, WI (US)

(21) Appl. No.: 07/679,660

(22) Filed: Apr. 2, 1991

Related U.S. Patent Documents

Reissue of:
(64) Patent No.: 4,829,780
Issued: May 16, 1989
Appl. No.: 07/149,393
Filed: Jan. 28, 1988

(51) Int. Cl.[7] ..... F25D 21/14
(52) U.S. Cl. ..... 62/288; 62/525; 165/176
(58) Field of Search ..... 62/285, 288, 290, 62/524, 525; 165/150, 152, 153, 176

(56) References Cited

U.S. PATENT DOCUMENTS

| | | | | |
|---|---|---|---|---|
| 1,899,080 | * | 2/1933 | Dalghesh | 165/153 |
| 2,093,256 | * | 9/1937 | Stiel | 165/152 |
| 2,874,555 | | 2/1959 | Disinger et al. | 62/525 |
| 3,030,782 | | 4/1962 | Karmazin | 62/515 |
| 3,161,234 | | 12/1964 | Rannenberg | 165/163 |
| 3,976,128 | | 8/1976 | Patel et al. | 165/153 |
| 4,217,953 | | 8/1980 | Sonoda et al. | 165/44 |
| 4,274,482 | * | 6/1981 | Sonoda | 62/525 X |
| 4,353,224 | * | 10/1982 | Nogogaki et al. | 62/515 |
| 4,371,034 | | 2/1983 | Yamada et al. | 165/108 |
| 4,379,486 | | 4/1983 | Kurihara | 165/153 |
| 4,434,843 | | 3/1984 | Alford | 165/150 |
| 4,448,241 | | 5/1984 | Andres et al. | 165/104.14 |
| 4,470,455 | | 9/1984 | Sacca | 165/167 |
| 4,487,038 | | 12/1984 | Iijima | 62/515 |
| 4,503,907 | | 3/1985 | Tanaka et al. | 165/133 |
| 4,513,577 | | 4/1985 | Wilson et al. | 62/91 |
| 4,557,324 | * | 12/1985 | Kondo et al. | 165/174 |
| 4,566,290 | | 1/1986 | Otterbein | 62/304 |
| 4,570,700 | * | 2/1986 | Ohara et al. | 165/134.1 |
| 4,580,624 | * | 4/1986 | Ishida et al. | 165/152 |
| 4,585,055 | | 4/1986 | Nakayama et al. | 165/115 |
| 4,586,346 | * | 5/1986 | St Pierre | 62/524 X |
| 4,586,566 | * | 5/1986 | Kern et al. | 165/173 |
| 4,588,025 | * | 5/1986 | Imai et al. | 165/133 |
| 4,592,414 | | 6/1986 | Beasley | 165/76 |
| 4,600,053 | | 7/1986 | Patel et al. | 165/170 |
| 4,614,231 | | 9/1986 | Proctor et al. | 165/153 |
| 4,615,383 | * | 10/1986 | Hisao | 165/150 |
| 4,615,384 | * | 10/1986 | Shimada et al. | 165/152 |
| 4,620,590 | | 11/1986 | Koisuka et al. | 165/150 |
| 4,621,685 | * | 11/1986 | Nozewa | 62/285 X |
| 4,621,687 | | 11/1986 | Ikuta et al. | 165/152 |
| 4,693,307 | * | 9/1987 | Scarselletta | 165/152 |

FOREIGN PATENT DOCUMENTS

| | | | | |
|---|---|---|---|---|
| 198993 | * | 12/1982 | (JP) | 62/285 |
| 217196 | * | 12/1983 | (JP) | 62/285 |

* cited by examiner

*Primary Examiner*—William E. Tapolcai
(74) *Attorney, Agent, or Firm*—Wood, Phillips, VanSanten, Clark & Mortimer

(57) ABSTRACT

An evaporator is made up of a plurality of heat exchange modules each in turn made up of an elongated lower header 30 of non rectangular cross section and having a plurality of tubes 40 mounted by the header 30 along its length and extending therefrom in side by side relation. The tubes 40, in the direction transversely of the header 30 are stacked and assembled together with the lower headers in sealing abutment with each other and defining upwardly opening channels 56. Sets of serpentine fins 44 can extend between adjacent tubes 40 in each module and/or between the plurality of modules.

36 Claims, 3 Drawing Sheets

EVAPORATOR WITH IMPROVED CONDENSATE COLLECTION

Matter enclosed in heavy brackets [ ] appears in the original patent but forms no part of this reissue specification; matter printed in italics indicates the additions made by reissue.

FIELD OF THE INVENTION

This invention relates to heat exchangers, particularly heat exchangers employed as evaporators; and to the collection of condensate in evaporators.

BACKGROUND OF THE INVENTION

As is well known, commonly employed air conditioning systems operating on a vapor compression cycle utilize evaporators as a means of cooling tee air to be conditioned. A refrigerant is flowed through an evaporator and expanded therein. In so doing, it absorbs its heat of vaporization, thereby cooling the medium with which it is in contact, typically heat exchanger tubes. The air to be conditioned is flowed over those tubes (which typically will be provided with fins for improved heat transfer). The air, at least locally, will be cooled below its dew point with the result that water will condense out of the air on the fins and on the tubes. This condensate must be removed or else it will freeze and plug the air flow path.

A variety of proposals for condensate removal have evolved and in their simplest form, involve the use of gravitation forces with a possible assist from the velocity of the air stream moving through the evaporator. These systems work rather well but frequently are bulky.

Furthermore, where relatively high velocity air streams may be present as, for example, in vehicular air conditioning systems where fans operate at high speed to achieve maximum cooling in a short period of time, it is desirable to remove the moisture from the evaporator as quickly as possible to prevent it from being entrained in the air steam and entering the passenger compartment of the vehicle. Furthermore, it is desirable, in order to obtain fuel economy, that the means employed to collect condensate weigh as little as possible. It is also desirable that the bulk of the same be absolutely minimized.

Furthermore, and equally importantly, it is desirable to provide a means whereby condensate is conducted away from the heat exchange surfaces of the heat exchanger so as to prevent condensate films from interfering with efficient heat transfer.

The present invention is directed to obtaining the above objects.

SUMMARY OF THE INVENTION

It is the principal object of the invention to provide a new and improved heat exchanger. More specifically, it is an object of the invention to provide a new and improved heat exchanger which is ideally suited for use as an evaporator and which includes improved means for collecting condensate that may condense on heat exchange surfaces during operation of the heat exchanger as an evaporator.

According to one facet of the invention, the foregoing object is achieved in a structure including a plurality of substantially identical rows of flattened tubes. Each of the rows is slightly spaced from adjacent other ones of the rows. Corresponding tubes in each row are aligned with corresponding tube in the other rows. The evaporator also includes the plurality of rows of serpentine fins extending generally transversely of the rows of flattened tubes and between corresponding tube pairs in each of the tube rows to be in heat exchange relation with the flattened tubes. Headers are provided to be in fluid communication with the flattened tubes.

According to this facet of the invention, there results, because of the slight spacing between the rows of tubes, spaces between the corresponding tubes in adjacent rows as well as the serpentine fins. With the tubes arranged non horizontally, the condensate may flow along the length of the tubes through these spaces under the influence of gravity to be collected.

According to another facet of the invention, there is provided an evaporator including a lower header comprised of a plurality of elongated, side by side, abutting header tubes of non rectangular cross section. Means defining a plurality of fluid passages for fluid to be evaporated are in fluid communication with the header tubes. Means are provided to seal the interfaces of the header tubes along the length thereof thereby defining upwardly opening condensate receiving channels because of the non rectangular cross sections of the header tubes. Finally, means are provided for holding the header tubes in assembled relation.

As a result of the foregoing, the header tubes not only serve the usual functions of headers, but their exterior surfaces serve as condensate collecting channels as well. This facet of the invention does away with the need for a separate condensate collector.

In a highly preferred embodiment of the invention both of the foregoing features are incorporated in a single structure. Thus such a preferred embodiment of the invention contemplates a plurality of heat exchange modules each comprised of an elongated lower header of non rectangular cross section and a plurality of tubes mounted by the header along its length and extending therefrom in side by side relation. The tubes, in the direction transversely of the header, have a lesser dimension than the header and the modules are stacked and assembled together with the lower headers in sealing abutment with each other and defining the upwardly open channels as mentioned previously. Sets of serpentine fins extend between adjacent tubes in each module.

In one embodiment of the invention, sets of serpentine fins are unique to each module while in another embodiment of the invention, not only do the serpentine fins extend between the adjacent tubes in each module, they additionally extend between the plurality of modules as well.

In a highly preferred embodiment, the headers are defined by header tubes and the sealing abutment is defined by a bond between adjacent headers along the length thereof. The bond also serves as the holding means whereby the headers are held together. In a highly preferred embodiment, the bond is formed by braze metal.

Because of their ready availability, the tubes utilized in forming the headers preferably are of generally circular cross section. A circular cross section is preferred because of its greater resistance to internal pressure.

As an alternative to the us of tubes bonded together to form the headers, the invention contemplates that a unitary structure having essentially the same cross section may be formed by means of extrusion and used as the headers.

According to one embodiment of the invention, the flattened tubes are each individually formed while still another embodiment of the invention contemplates that groups of flattened tubes may be in the form of a multiple passage extrusion.

Other objects and advantages will become apparent from the following specification taken in connection with the accompanying drawings.

DESCRIPTION OF THE PREFERRED EMBODIMENT

Figure 1:
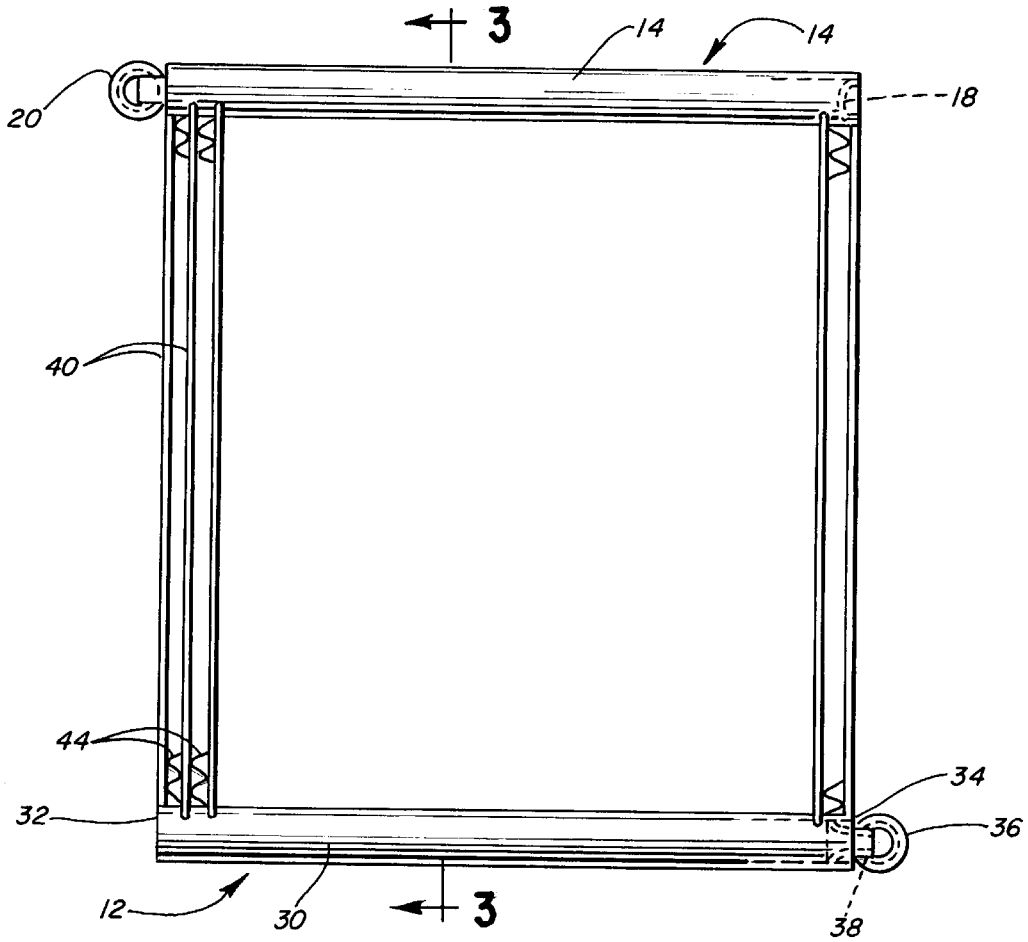
FIG. 1 is a front elevation of an evaporator made according to the invention.

An exemplary embodiment of an evaporator made according to the invention is illustrated in the drawings and will be described herein specifically as an evaporator. However, in some instances, where its compactness as a heat exchanger is desirable, it may be utilized as other than an evaporator and the invention is intended to encompass such non evaporator uses.

Figure 2:
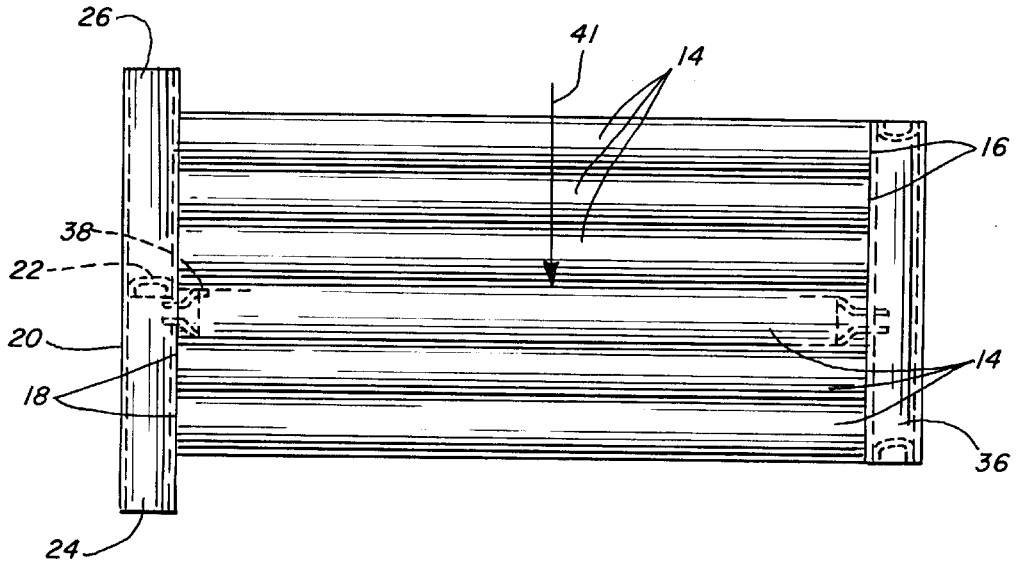
FIG. 2 is a plan view of the evaporator.

As seen in FIG. 1, the evaporator includes an upper header, generally designated 10 and a lower header, generally designated 12. As seen in FIG. 2, the upper header 10 is comprised of a plurality of elongate tubes 14 which are in side by side relation. The tubes 14, at the right hand ends 16 as viewed in FIG. 2, are sealed by plugs 17 (FIG. 1). At the opposite ends 18, the tubes 14 are in fluid communication with the interior of a manifold 20. Generally centrally within the manifold 20 is a plug 22 and half of the tubes 14 are in fluid communication with the manifold 20 on one side of the plug 22 while the other half is in the fluid communication on the opposite side. As will be seen, this allows one end 24 of the manifold 20 to be utilized as an inlet and the other end 26 to be used as an outlet. However, the manifold 20 can be used either as an inlet or an outlet simply by placing all of the tubes 14 in fluid communication therewith on one side of the plug 22.

The lower header 12 is made up with an identical number of elongated tubes 30. The tubes 30 are in side by side abutting relation as best illustrated in FITS. 3–5 inclusive. Their left hand ends 32 (as viewed in FIG. 1) are plugged by means not shown but similar to the plugs 18 or 22 while their right hand ends 34 are in fluid communication with the interior of a manifold 36. Fittings 38 similar to conventional reducers may be utilized to establish fluid communication between the tubes 14 and 30 and the respective manifolds 20 and 36.

According to the invention, the tubes 30, and optionally the tubes 14 as well, have a non rectangular cross section which preferably is circular. A circular configuration for the headers maximizes the burst pressure that the same can withstand while utilizing a minimum of material for the fabrication of the headers. In short, a Index 774 circular cross section provides maximum strength as well as a relatively lightweight structure.

As seen in FIG. 1, the headers 10 and 12 are spaced but parallel and there are provided a plurality of rows of flattened tubes 40. The number of rows of tubes 40 is equal to the number of tubes 14 or the number of tubes 30, in the illustrated example, six. The flattened tubes 40 are in fluid communication with the interior of corresponding ones of the header tubes 14 and 30 and thus establish fluid communication between the headers 10 and 12.

Thus, in the embodiment illustrated, incoming refrigerant or the like may enter the manifold 20 through the inlet 24 to enter the associated three tubes 14 and flow downwardly through the tubes 40 to three of the tubes 30. The refrigerant will flow from the tubes 30 into the tube 36 where it is conducted to the remaining three of the tubes 30 and upwardly through the tubes 40 to the remaining three tubes 14 and ultimately out the outlet 26. Thus, the illustrated embodiment is a two-pass evaporator. By eliminating the plug 22 and placing the outlet on the manifold 36, a single-pass evaporator may be formed. Alternatively, additional plugs 22 could be used in varying location to increase the number of passes above if desired.

Preferably, however, in a single-pass evaporator, the refrigerant inlet will be associated with a manifold such as the manifold 36 associated with the bottom tubes 30 rather than the upper tubes 14. The outlet will be associated with the latter.

It should also be noted that manifolds 20 and 36 need not be located on opposite sides of the evaporator as illustrated in FIGS. 1 and 2. Generally speaking, they will be on the same side of the evaporator as this will provide a smaller overall envelope for the evaporator.

It should also be noted that maximum efficiency in an evaporator such as illustrated in the drawings having the element 24 as an inlet will be achieved when the direction of air flow through the evaporator is in the direction of an arrow 41 shown in FIG. 2. As a result, refrigerant will be flowing from back to front through the evaporator core while air will be flowing from front to back through the core in what may be somewhat loosely termed a "countercurrent" type of flow.

The dimension of the tubes 40 transverse to the length of the tubes 30 is slightly less than that dimension of the tubes 30.

Figure 3:
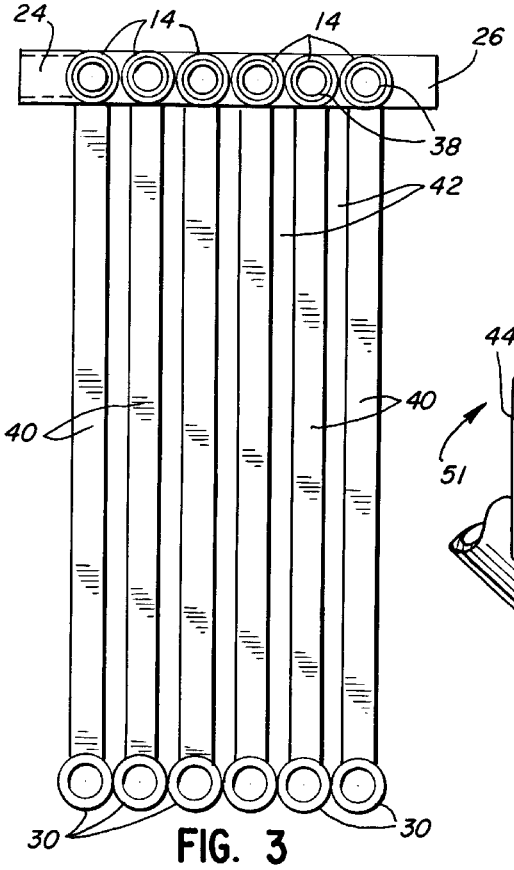
FIG. 3 is a sectional view taken approximately along the line 3—3 in FIG. 1.
Figure 4:
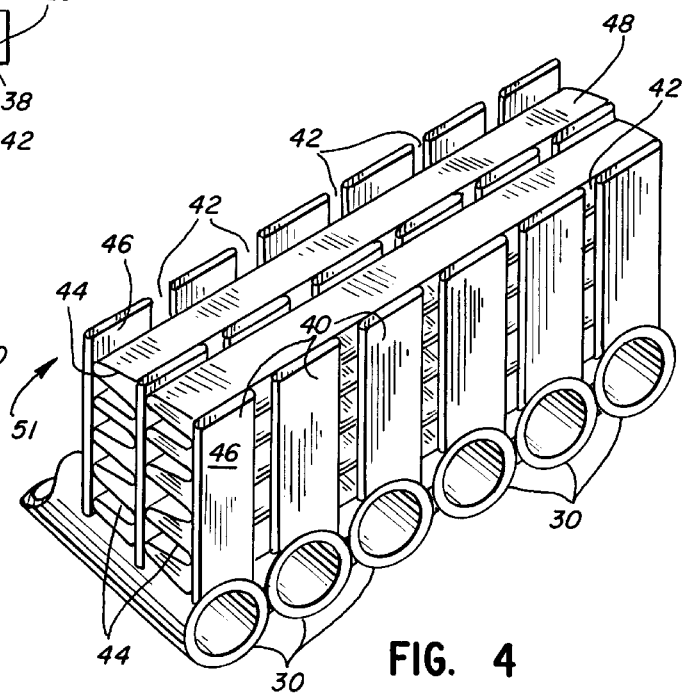
FIG. 4 is an enlarged, fragmentary perspective view of a lower portion of the evaporator.
Figure 5:
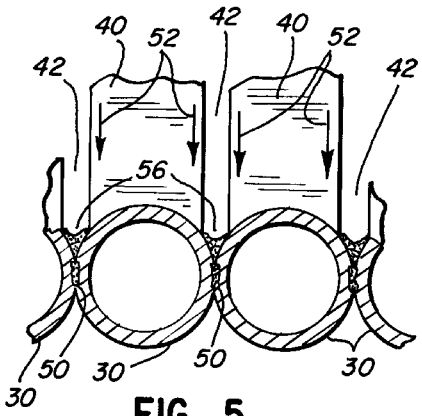
FIG. 5 is a further enlarged, fragmentary sectional view of a lower portion of the evaporator with serpentine fins removed for clarity.

As can be seen in FIGS. 3–5, inclusive, there are six substantially identical rows of the tubes 40 and spaces 42 exist between each of the rows of the tubes 40. This is a relatively small spacing and frequently will be on the order of about a quarter of an inch or less.

As seen in FIG. 4, corresponding tubes 40 in each of the rows of tubes are aligned with each other, that is, on a common straight line. Thus, it will be appreciated that as described thus far the evaporator is built up of a plurality of substantially identical modules, each made up of a header tube 14, a header tube 30, and a plurality of the flattened tubes 40. The modules are interconnected by the cross tubes 20 and 36 as well as by serpentine fins 44. In particular, there are provided a plurality of rows of serpentine fins 44 and, as seen in FIG. 4, each serpentine fin 44 extends through all of the rows 40 and is in heat exchange contact with adjacent tubes or tube pairs in each such row. As is well known, the crests of the serpentine fins preferably are brazed or otherwise bonded to the flat surfaces 46 of the tubes 40. If desired, the serpentine fins 44 may be provided with louvers shown schematically at 48.

The foregoing results in a construction wherein the flattened tubes 40 extend generally transversely to the header tubes 14 and 30 while the rows of the serpentine fins 44 extend transversely to the rows of the tubes 40 as well as to the header tubes 14 and 30.

Preferably, the assembled components are brazed together with at least the lower header tubes 30 in abutting relation. This results in a brazed bond 50 at the interface of adjacent tubes 30 along their entire length. This bond, holds the various modules in assembled relationship and for strength, it is desirable that such a bond also exist between the tubes 14. However, in the case of the header tubes 30, the bond 50 serves an additional purpose and thus is made along the entire length of the tubes 30. Specifically, the bond also serves to seal the interface of adjacent tubes 30.

In an air conditioning use, the air to be conditioned may be flowed through the heat exchanger thus described in the direction of an arrow 51 shown in FIG. 4. That is to say, the same is flowing in the direction of the serpentine fins 44. As the air is cooled below its dew point, moisture will begin to condense on the serpentine fins 44 as well as the tubes 40. Gravity will cause the condensate to flow along the serpentine fins to the tubes 40 while the air flow will tend to cause condensate on the flat walls 46 of the tubes 40 generally to flow to the immediately rearward space 42 between adjacent tubes 40 in adjacent rows. Gravity will then cause the condensate to flow downwardly along the trailing edge of each tube in the space 42 toward the lower header tubes 30. There may be some flow along the forward edges of the tubes 40 as well.

This type of flow is shown by the arrows 52 in FIG. 5 and ultimately, the water will flow to upwardly opening concave areas 56 defined by the interfaces of adjacent ones of the tubes 30 because of their non rectangular cross sections. Thus, the condensate will be collected in those channels. Desirably, the evaporator will be rotated slightly clockwise or counterclockwise from the position shown in FIG. 1 so that the lower header tubes 30 are not perfectly horizontal. When this is done, the forces of gravity will then cause the accumulating water in the channels 56 to flow to one side or the other of the lower header 12 to be disposed of.

Figure 6:
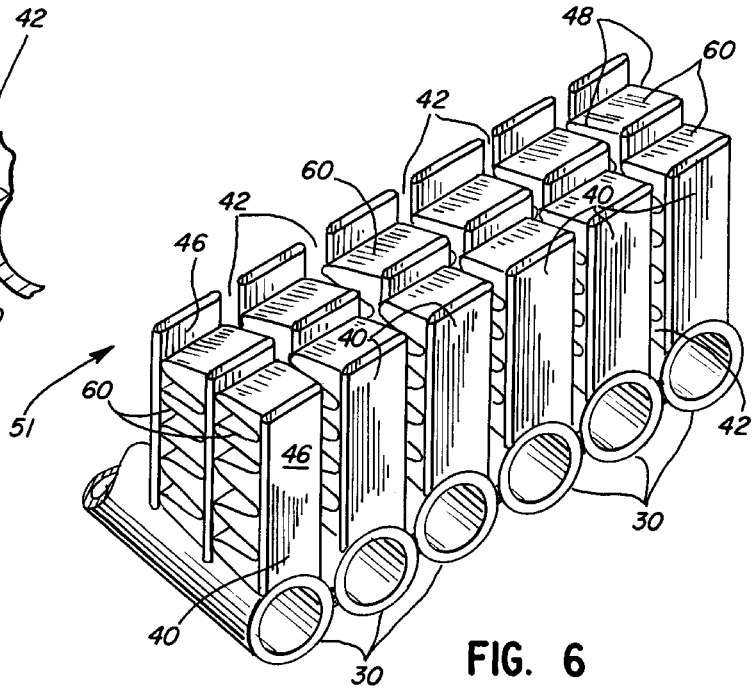
FIG. 6 is a view similar to FIG. 4 but of a modified embodiment of the invention.

One modified embodiment of the invention is illustrated in FIG. 6. According to this embodiment of the invention, the serpentine fins 44 which extend between the modules as shown in the embodiment of FIG. 4 are dispensed with. Instead, serpentine fins 60 extending between the flat surfaces 46 of adjacent tubes 40 in each row only are utilized. That is to say, the serpentine fins 60 utilized in the embodiment illustrated in FIG. 6 are unique to a given module and do not extend between modules as in the embodiment illustrated in FIG. 4.

Figure 7:
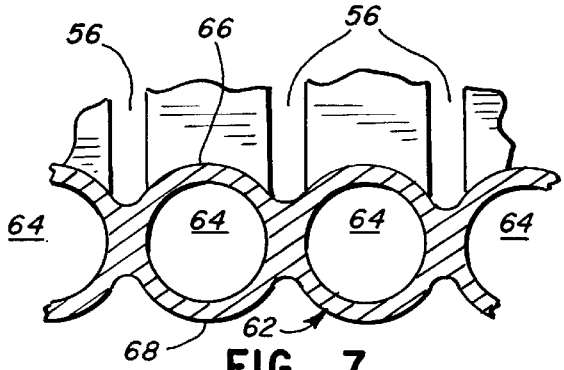
FIG. 7 is a view similar to FIG. 5 but of a further modified embodiment.

Still another modified embodiment is illustrated in FIG. 7. In the embodiment of FIG. 7, the individual header tubes 30 and the bonds 50 therebetween are done away with and replaced with a one-piece extrusion, generally designated 62, having the same overall configuration. That is to say, the extrusion 62 defines a plurality of header passages 64 of circular cross section which are parallel to each other and on the same centers as the tubes 30 utilized in the embodiments of FIGS. 1–6. The extrusion 62 has upper and lower exterior surfaces 66 and 68 of the same general configuration as the assembled header tubes 30 in the embodiment of FIGS. 1–6 and therefore includes the upwardly opening concave areas 56 between adjacent passages 64 to serve the same purpose as the concave areas in the embodiment of FIGS. 1–6. In this embodiment of the invention, in the formation process, it may be necessary to utilize a thin preform of braze metal on the upper surface 66 of the extrusion 62 to properly bond the flattened tubes 40 to the extrusion 62.

Figure 8:
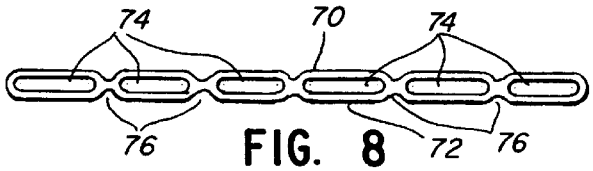
FIG. 8 is a view of a unitary structure that may be utilized in lieu of a plurality of flattened tubes as still another embodiment of the invention.

FIG. 8 shows still another embodiment of the invention wherein a single extrusion may be utilized to replace a plurality of tubes, specifically, the flattened tubes 40. There is provided an elongated, relatively narrow extrusion 68 having the cross-section illustrated. It includes opposed, flattened surfaces 70 and 72 that are the counterparts of the surfaces 46 on the flattened tubes 40. Interiorally, the extrusion 68 includes a plurality of flow passages 74 which correspond to the interiors of the tubes 40. Thus, three tube structures each formed of the extrusion 68 illustrated in FIG. 8 could be utilized to replace the eighteen tubes 40 illustrated in, for example, FIG. 6.

To assure that there are spaces corresponding to the spaces 42 for condensate to travel downwardly toward the lower header 12, both of the surfaces 70 and 72 are provided with concave areas or longitudinally extending grooves 76 between adjacent passages 74. These concave areas 76 will not be obstructed by serpentine fins and thus provide flow passages as do the spaces 42.

Figure 9:
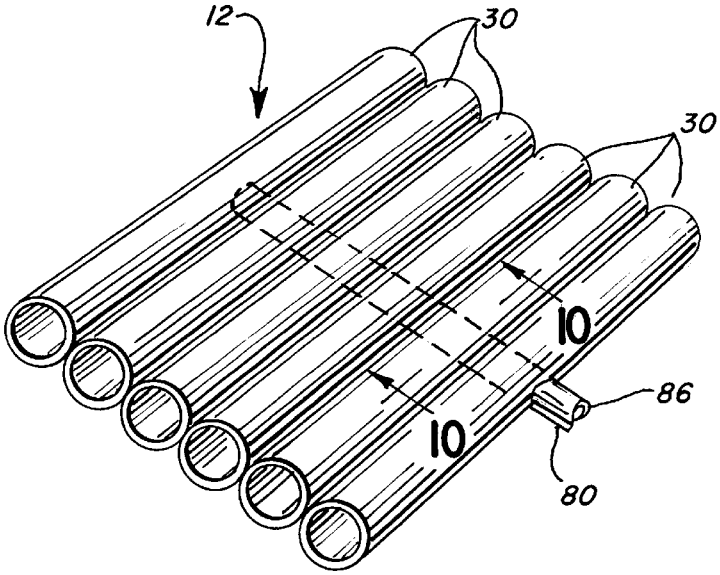
FIG. 9 is a fragmentary, perspective view of a modified embodiment of the invention, and particularly of a preferred manifold construction.
Figure 10:
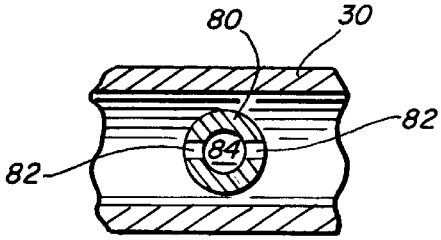
FIG. 10 is a sectional view taken approximately along the line 10—10 in FIG. 9.

Still another embodiment of the invention is illustrated in FIGS. 9 and 10. This embodiment illustrates alternative manifold structures applicable to either the upper header 10 or the lower header 12 or both, which are highly desirable because of the compactness they provide. As seen in FIG. 9, the lower header 12 is made up of a plurality of the tubes 30 although it could just as well be made up of the extrusion 62. In any event, the ends of the tubes 30 are sealed by means not shown and intermediate the ends thereof, a smaller diameter tube 80 extends generally transversely to the length of the tubes 30 pass through the interiors of all but one of the end tubes 30 although, in some instances, it might even be desirable to extend through all of the tubes 30. The tube 80 is sealed to each of the tubes 30 at the various interfaces so as to prevent leakage therebetween and within each of the tubes 30, as shown in FIG. 10, the tube 80 includes one or more apertures 82 in its side wall which thus place the interior 84 of the tube 80 in fluid communication with the interior of the corresponding tube 30. Thus, the tube 80 may be utilized as an inlet or an outlet. It may also be plugged intermediate its ends to provide multiple passes where desirable. Generally speaking, the outer diameter of the tube 80 will be substantially less than the inner diameter of the tubes 30 to provide spacing between the two as shown in FIG. 10 so as to avoid unduly restricting flow within the tubes 30 as well as to avoid interference between the tube 80 and any tubes 40 or the extrusion 68 shown in FIG. 8 when mounted to the tubes 30.

Alternatively, the tube 80 may be utilized as a distributor by having any external end, as the ends 86 (FIG. 9), plugged. In such a case, an inlet and/or outlet (not shown) is attached to one of the tubes 30 and in fluid communication with the interior thereof. Fluid may enter the tube 80 through the apertures 82 in the tube 30 having the inlet and flow through the interior 84 to exit the apertures 82 into the interior of the other tubes 30.

From the foregoing, it will be appreciated that an evaporator made according to the invention is ideally suited for mass production because it is made up of substantially identical modules. Furthermore, by use of the unique construction, improved condensate collection results. Bulk and weight are minimized because the header tubes serve a dual purpose in acting as conduits for refrigerant with their inner surfaces acting to confine the refrigerant to the desired flow path and their outer surfaces acting as flow channels for condensate.

We claim:

1. An evaporator comprising:

a plurality of heat exchanger modules each comprised of an elongated lower header of non rectangular cross section and a plurality of tubes mounted by the header along its length and extending therefrom in side by side relation;

said tubes, in the direction transversely of the header, having a lesser dimension than the header;

said modules being stacked and assembled together with said lower headers in sealing abutment with each other and defining upwardly open channels at their interfaces, and with the corresponding tubes in the modules in alignment with each other; and sets of serpentine fins extending between adjacent tubes in each module.

2. The evaporator of claim 1 wherein said serpentine fins are individual to each module.

3. The evaporator of claim 1 wherein said sets of serpentine fins additionally extend between said plurality of modules.

4. The evaporator of claim 1 wherein said headers are defined by header tubes and said sealing abutment is defined by a braze between adjacent header tubes along the length thereof.

5. The evaporator of claim 4 wherein said header tubes are of generally circular cross section.

6. An evaporator comprising:

two spaced headers each made up of a plurality of header tubes of non rectangular cross section in side by side abutting relation;

means sealing the interfaces of said header tubes;

a plurality of substantially identical, spaced rows of flattened tubes, the tubes of each row extending between and being in fluid communication with associated header tubes in each of said headers; and a plurality of rows of serpentine fins extending generally transverse to and between said rows of flattened tubes, each serpentine fin that is interior within its row being in heat exchange relation with two of said flattened tubes in each of the rows thereof;

whereby condensate on said flattened tubes may flow toward a lower one of said headers through the spaces between the rows of flattened tubes to be collected at the interfaces of said header tubes and flow therealong to a point of disposal.

7. The evaporator of claim 6 wherein the plurality of header tubes forming at least one of said headers and said means sealing the interfaces of said header tubes is defined by a single extrusion.

8. The evaporator of claim 6 wherein said header tubes are defined by individual tubes.

9. The evaporator of claim 6 wherein at least some of said flattened tubes are defined by an extrusion with the space between the rows thereof being defined by concave areas in said extrusion.

10. The evaporator of claim 6 wherein said flattened tubes are defined by individual tubes.

11. An evaporator comprising:

two spaced headers each made up of a plurality of header tubes of circular cross section in side by side abutting relation;

bonding means bonding said header tubes together along their length and sealing the interface of said header tubes;

a plurality of substantially identical rows of flattened tubes, the tubes of each row extending between and being in fluid communication with associated header tubes in each of said headers; and each of said rows of flattened tubes being slightly spaced from adjacent ones of said rows of flattened tubes;

a plurality of rows of serpentine fins extending generally transverse to and between said rows of flattened tubes, each serpentine fin that is interior within its row being in heat exchange relation with two of said flattened tubes in each of the rows thereof;

whereby condensate on said flattened tubes may flow toward a lower one of said headers through the spaces between the rows of flattened tubes to be collected at the interfaces of said header tubes and flow therealong to a point of disposal.

12. The evaporator of claim 11 wherein said bonding means comprises braze metal.

13. An evaporator comprising:

two spaced headers each made up of a plurality of header tubes of non rectangular cross sections in side by side abutting relation;

braze means assembling said header tubes to each other and sealing the interface of said header tubes;

a plurality of substantially identical, spaced rows of flattened tubes, the tubes of each row extending transversely between and being in fluid communication with associated header tubes in each of said headers; and a plurality of rows of serpentine fins extending generally transverse to and between said rows of flattened tubes, and transversely to said header tubes, each serpentine fin that is interior within its row being in heat exchange relation with two of said flattened tubes in each of the rows thereof;

whereby condensate on said flattened tubes may flow toward a lower one of said headers through the spaces between the rows of flattened tubes to be collected at the interfaces of said header tubes and flow therealong to a point of disposal.

14. An evaporator comprising:

a lower header comprised of a plurality of elongated side by side, abutting header tubes of non rectangular cross section;

a means defining a plurality of fluid passages for a fluid to be evaporated in fluid communication with said header tubes;

means sealing the interfaces of said header tubes along the lengths thereof to define upwardly opening condensate receiving channels; and means holding said header tubes in assembled relation.

15. The evaporator of claim 14 wherein said sealing means is additionally said holding means.

16. The evaporator of claim 15 wherein said sealing means is a bonding means.

17. The evaporator of claim 14 further including a manifold, said manifold including a tube extending through said plurality of abutting header tubes in generally transverse relation thereto and being sealed thereto, said manifold tube including apertures in its side walls in fluid communication with the interior of at least some of said abutting header tubes.

18. The evaporator of claim 14 wherein said plurality of abutting header tubes, said sealing means and said holding means are all defined by a single extrusion.

*19. A heat exchanger comprising:*

*a plurality of heat exchange units in side by side relation, each said unit comprising first and second spaced headers and a plurality of generally parallel, spaced tubes extending between the headers and in fluid communication therewith so that fluid may flow from one header to the other through said parallel tubes;*

*fins in heat exchange relation with said tubes;*

*first and second spaced manifolds, said first headers being associated with an in fluid communication with said first manifold and said second headers being associated with and in fluid communication with said second manifold;*

*an inlet in one of said manifolds; and,*

*an outlet in one of said manifolds;*

*whereby fluid in said manifolds is distributed to all of the headers associated therewith which in turn distribute fluid to the plurality of tubes in each of said units.*

*20. The heat exchanger of claim 19 further including at least one plug in one of said manifolds to define a multiple pass heat exchanger.*

*21. The heat exchanger of claim 19 wherein said headers and said manifolds are tubes and further including at least one plug in one of said tubes to define a multiple pass heat exchanger.*

*22. The heat exchanger of claim 19 wherein said headers are formed of tubes and said manifolds are attached to the ends of the corresponding tubes.*

*23. The heat exchanger of claim 22 wherein said manifolds are on the same side of said heat exchanger.*

*24. The heat exchanger of claim 19 wherein said manifolds are attached to corresponding ends of the corresponding headers and are on the same side of said heat exchanger.*

*25. The heat exchanger of claim 19 wherein said units are substantially identical.*

*26. The heat exchanger of claim 19 wherein said tubes are flattened tubes.*

*27. A multiple pass evaporator comprising:*

*At least two heat exchange units in side by side relation, each unit having first and second spaced headers and a plurality of tubes extending between and in fluid communication with the respective first and second headers;*

*an inlet to the first header of one of said units;*

*an outlet from the first header of another of said units; and*

*means establishing fluid communication between the second headers of said one and said another units;*

*whereby fluid entering said inlet first flows through said one unit to said second header thereof and then to said another unit and said first header thereof and subsequently from said outlet in a multiple pass flow path for said fluid;*

*wherein a manifold extends between said first headers of said one and said another units and said inlet and said outlet are disposed on said manifold in spaced relation to one another, and further including a plug in said manifold between said and said outlet and between the first headers of said one and said another units.*

*28. A heat exchanger comprising:*

*first and second cores aligned parallel to each other, each of said cores including a plurality of flat tubes disposed in parallel with a space therebetween, and a plurality of corrugated fins located in and extending through the spaces between said flat tubes in each of said first and second cores, said corrugated fins including a plurality of slits located between said first and second cores;*

*header pipes connected to opposite ends of said flat tubes of said first and second cores;*

*said header pipes being in fluid communication with said flat tubes; and*

*first and second means disposed on the upper and lower ends of said first and second cores to securely fix said first and second cores together.*

*29. The heat exchanger according to claim 28 wherein said corrugated fins are common to both of said cores.*

*30. A heat exchanger comprising:*

*a first core having a plurality of fluid-conducting tubes and a plurality of fins associated therewith;*

*a second core having a plurality of fluid-conducting tubes and a plurality of fins associated therewith wherein at least a portion of said fins are common to and connected to said first and second cores; and*

*means disposed between said first and second cores for reducing the direct heat transfer between said first and second cores.*

*31. The heat exchanger according to claim 30 wherein said common fins extend from the front of said first core to the rear of said second core.*

*32. The heat exchanger according to claim 30 wherein all of said fins are common to said first and second cores.*

*33. A heat exchanger comprising:*

*a plurality of heat exchanger cores each having a pair of header pipes extending in parallel relation to each other, a plurality of flat heat transfer tubes disposed between each pair of header pipes in parallel relation to one another and connected to and communicating with said pair of header pipes at their end portions, and a plurality of fins provided on the sides of said heat transfer tubes, said plurality of heat exchanger cores being integrally assembled in parallel relation to one another;*

*an inlet means and an outlet means for conveying fluid to and from said heat exchanger cores; and*

*means for connecting and communicating between one of said pair of header pipes of a heat exchanger core of said plurality of heat exchanger cores and one of said pair of header pipes of another heat exchanger core of said plurality of heat exchanger cores, said connecting and communicating means including a manifold connected to said inlet means to distribute a heat medium introduced through said inlet means to at least two of said heat exchanger cores, and said heat exchanger further comprising another said connecting and communicating means including a manifold connected to said outlet means to join said heat medium passed through said plurality of heat exchanger cores and directs that heat medium to said outlet means.*

*34. The heat exchanger according to claim 33, wherein said plurality of heat exchanger cores are substantially the same size.*

*35. A heat exchanger comprising:*

*a plurality of heat exchanger cores each having a pair of header pipes extending in parallel relation to each*

*other, a plurality of flat heat transfer tubes disposed between each pair of header pipes in parallel relation to one another and connected to and communicating with said pair of header pipes at their end portions, and a plurality of fins provided on the sides of said flat heat transfer tubes, said plurality of heat exchanger cores being integrally assembled in parallel relation to one another;*

*means for connecting and communicating between one of said pair of header pipes of a heat exchanger core of said plurality of heat exchanger cores and one of said pair of header pipes of another head exchanger core of said plurality of heat exchanger cores;*

*an inlet means for a heat medium connected to and communicating with one of said pair of header pipes of at least one of said plurality of heat exchanger cores; and*

*an outlet means for said heat medium connected to and communicating with another one of said pair of header pipes of at least one of said plurality of heat exchanger cores, said inlet means and said outlet means being disposed on the same side of the respective heat exchanger cores to be connected to said inlet means and said outlet means, said inlet means and said outlet means being positioned at substantially the same height, and said inlet means and said outlet means being connected to said one of said pair of header pipes and said another one of said pair of header pipes, respectively, via a manifold.*

*36. A heat exchanger comprising:*

*a plurality of heat exchanger cores each having a pair of header pipes extending in parallel relation to each other, a plurality of flat heat transfer tubes disposed between said pair of header pipes in parallel relation to one another and connected to and communicating with said pair of header pipes at their end portions, and a plurality of fins provided on the sides of said flat heat transfer tubes, said plurality of heat exchange cores being integrally assembled in parallel relation to one another, said flat heat transfer tubes each defining a longitudinal axis, and each of said plurality of fins extending through at least two of said heat exchanger cores in a direction transverse to said longitudinal axis of said heat transfer tubes;*

*means for connecting and communicating a heat medium between one of said header pipes of a heat exchanger core of said plurality of heat exchanger cores and one of said pair of header pipes of another heat exchanger core of said plurality of heat exchanger cores;*

*an inlet means of said heat medium connected to and communicating with one of said pair of header pipes of at least one of said plurality of heat exchanger cores; and*

*an outlet means for said heat medium connected to and communicating with another one of said pair of header pipes of at least one of said plurality of heat exchanger cores.*

* * * * *